(12) United States Patent
Nemugaki et al.

(10) Patent No.: US 7,389,656 B2
(45) Date of Patent: Jun. 24, 2008

(54) APPARATUS HAVING A CURVED ROLLER FOR BENDING A GLASS SHEET

(75) Inventors: Yoichi Nemugaki, Aichi (JP); Toshimitsu Sato, Aichi (JP)

(73) Assignee: Asahi Glass Company, Limited, Tokyo (JP)

( * ) Notice: Subject to any disclaimer, the term of this patent is extended or adjusted under 35 U.S.C. 154(b) by 377 days.

(21) Appl. No.: 10/952,753

(22) Filed: Sep. 30, 2004

(65) Prior Publication Data

US 2005/0072190 A1 Apr. 7, 2005

Related U.S. Application Data

(63) Continuation of application No. 10/389,995, filed on Mar. 18, 2003, now Pat. No. 6,843,074, which is a continuation of application No. PCT/JP02/07268, filed on Jul. 17, 2002.

(30) Foreign Application Priority Data

Jul. 18, 2001 (JP) ............................... 2001-217759

(51) Int. Cl.
*C03B 23/02* (2006.01)

(52) U.S. Cl. ............................ 65/370.1; 65/287; 65/291

(58) Field of Classification Search ................ 65/370.1, 65/273, 287, 102, 111, 90, 289, 291; 198/780, 198/782, 781.01

See application file for complete search history.

(56) References Cited

U.S. PATENT DOCUMENTS

| | | | |
|---|---|---|---|
| 4,123,246 A | 10/1978 | Johnson | |
| 4,139,359 A | 2/1979 | Johnson et al. | |
| 4,311,509 A * | 1/1982 | Reader et al. | 65/351 |
| 4,787,504 A * | 11/1988 | Schultz | 198/782 |
| 4,820,327 A | 4/1989 | Letemps et al. | |
| 4,853,019 A | 8/1989 | Blank et al. | |
| 5,004,492 A * | 4/1991 | Borer et al. | 65/289 |
| 5,178,660 A | 1/1993 | Wampler et al. | |
| 5,938,810 A | 8/1999 | De Vries, Jr. et al. | |
| 5,992,180 A | 11/1999 | Tsuchiya et al. | |
| 6,363,753 B1 | 4/2002 | Yoshizawa et al. | |

FOREIGN PATENT DOCUMENTS

CN 1272830 A 11/2000

(Continued)

OTHER PUBLICATIONS

Machine translation of JP 10-218629 retrieved from http://www.ipdl.jpo.go.jp/homepg_e.ipdl on Nov. 17, 2003.

*Primary Examiner*—Carlos Lopez
(74) *Attorney, Agent, or Firm*—Oblon, Spivak, McClelland, Maier & Neustadt, P.C.

(57) ABSTRACT

A glass sheet is heated to a forming temperature in a heating furnace, the heated glass sheet is conveyed along a conveying plane defined by a plurality of rollers of a roller conveyer, and is moved up and down on the rollers according to a position of the glass sheet to curve a part of the conveying plane with respect to a glass sheet conveying direction to bend the glass sheet to have a desired curvature by its own weight. The rollers are curved rollers.

4 Claims, 14 Drawing Sheets

FOREIGN PATENT DOCUMENTS

| | | |
|---|---|---|
| EP | 1 006 086 | 6/2000 |
| EP | 1 006 086 A2 | 6/2000 |
| EP | 1 020 412 | 7/2000 |
| JP | 54-085217 | 7/1979 |
| JP | 09-040435 | 2/1997 |
| JP | 10-218629 | 8/1998 |
| JP | 2000-072460 | 3/2000 |
| JP | 2000-072461 | 3/2000 |
| JP | 2000-169167 | 6/2000 |
| JP | 2000-169170 | 6/2000 |
| WO | WO 91/03432 | 3/1991 |
| WO | 99/65833 | 12/1999 |

\* cited by examiner

APPARATUS HAVING A CURVED ROLLER FOR BENDING A GLASS SHEET

This application is a continuation of U.S. application Ser. No. 10/389,995, filed Mar. 18, 2003, now U.S. Pat. No. 6,843,074, the entire contents of which are incorporated herein by reference.

TECHNICAL FIELD

The present invention relates to an apparatus for bending a glass sheet and a curved roller, particularly, to an apparatus for bending a glass sheet used for transporting machines such as automobiles, vessels, trains and aircrafts, buildings and other various applications, and a curved roller.

BACKGROUND ART

The inventors of the present application proposed in JP-A-2000-72460 a forming apparatus for bending a glass sheet heated to a temperature close to the softening point in a heating furnace into a glass sheet having a desired curvature. This apparatus conveys a glass sheet heated in the heating furnace, along a conveying plane defined by a plurality of rollers of a roller conveyer, and by moving the rollers up and down according to the position of the glass sheet, a part of the conveying plane is bent with respect to the glass sheet conveying direction and the glass sheet is bent to have a desired curvature.

Meanwhile, U.S. Pat. No. 4,123,246 discloses an apparatus for bending a glass sheet heated to a temperature close to the softening point in a heating furnace, by conveying the glass sheet on a roller conveyer constituted by a plurality of curved rollers each curved with respect to the direction perpendicular to the glass sheet conveying direction.

According to the apparatus disclosed in the above two documents, the softened glass bends down by its own weight along the curved plane, whereby the glass sheet can be bent according to the curved conveying plane.

However, although, JP-A-2000-72460 discloses that a glass sheet is formed to have a plane curved with respect to the glass sheet conveying direction, it does not disclose that a glass sheet is formed to have a plane curved with respect to the direction perpendicular to the glass sheet conveying direction.

Further, the conventional apparatus for bending disclosed in U.S. Pat. No. 4,123,246 had a problem that although it could form a glass sheet to have a curved plane with respect to the direction perpendicular to the glass sheet conveying direction, it could not form a glass sheet to have a curved plane with respect to the glass sheet conveying direction.

Both of these apparatuses have a conveying plane curved only with respect to one direction, and therefore, it is difficult to form a complicatedly curved glass having a plane curved with respect to two directions.

It is an object of the present invention to solve the above problems of the conventional techniques, and to provide a curved roller whose curvature can optionally be changed, and an apparatus for bending a glass sheet, so that a glass sheet having a complicatedly curved shape can be produced.

DISCLOSURE OF THE INVENTION

The present invention provides an apparatus for bending a glass sheet, comprising a heating furnace to heat a glass sheet to a bending temperature, and a roller conveyer having a plurality of rollers to convey the heated glass sheet along a conveying plane defined by the rollers, said rollers being movable up and down according to the position of the glass sheet, to have a part of said conveying plane bent with respect to the conveying direction of the glass sheet thereby to let the glass sheet bend by its own weight to have a desired curvature; characterized in that said rollers are curved rollers.

Further, the present invention provides a curved roller comprising a variable curvature rod having a first link structure to realize a predetermined mono-curvilineal shape, and a second link structure provided beside it to realize a predetermined mono-curvilineal shape, and a ring roller rotatable about said variable curvature rod as a rotation axis;

wherein said first and second link structures are each constituted by a plurality of link members connected via gear portions so as to be swingable, each of said link members has two pivot pins located at a constant pitch, and the link members constituting said first link structure, and the link members constituting said second link structure, share said pivot pins with half pitch shifted from each other.

Further, the present invention provides a curved roller comprising a straight rod-shaped core shaft connected to a motor, a driving rotor formed integrally with the core shaft at the central portion in the axial direction of the core shaft, and driven rotors supported by the core shaft on both sides of the driving rotor and each formed to have a substantially frustum conical shape.

BEST MODE FOR CARRYING OUT THE INVENTION

Now, preferred embodiments of an apparatus for bending a glass sheet, according to the present invention, will be described with reference to drawings.

Figure 1:
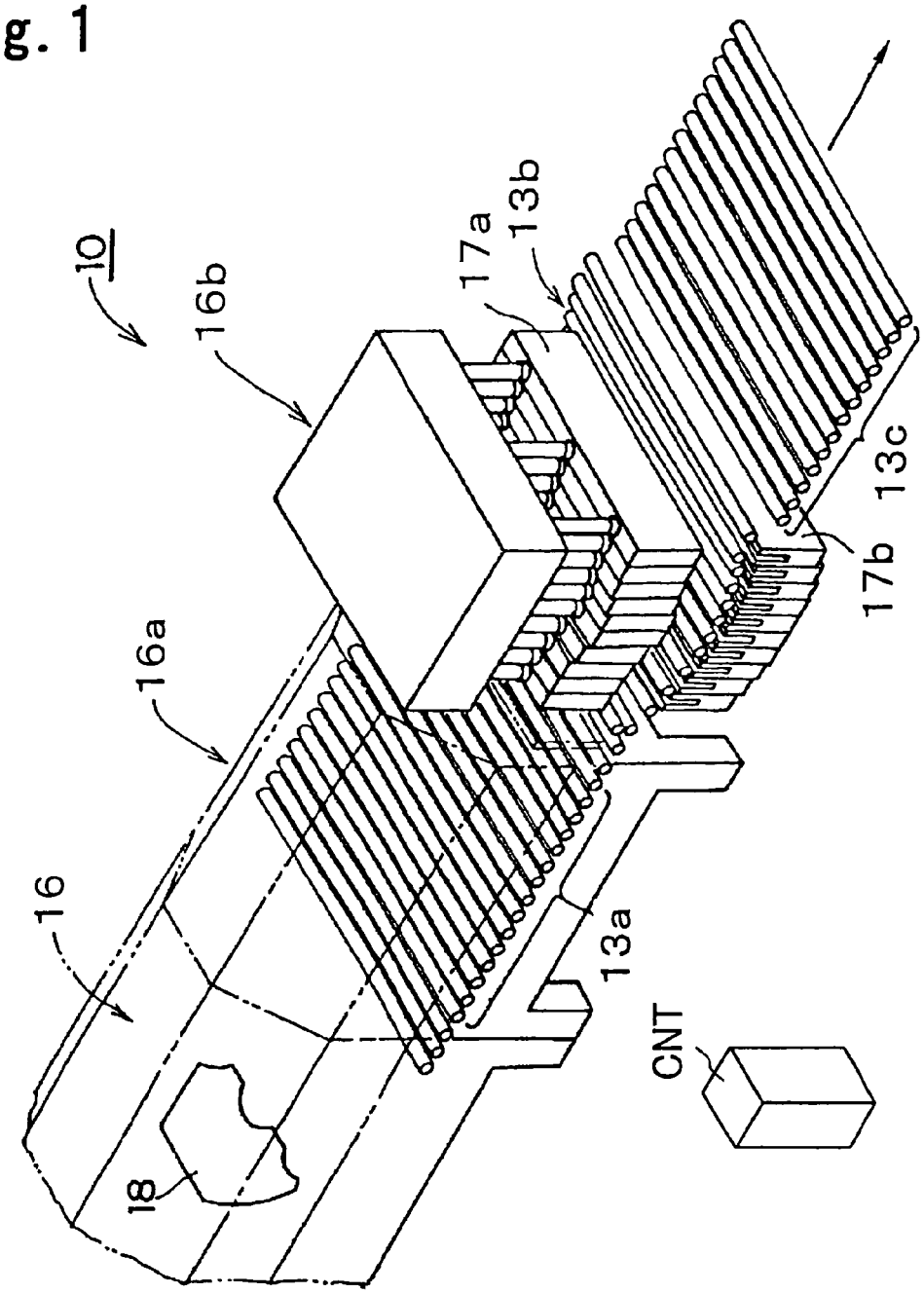
FIG. 1: A perspective view illustrating an embodiment of an apparatus for bending a glass sheet according to the present invention.

FIG. 1 is a perspective view illustrating an embodiment of an apparatus for bending a glass sheet. As illustrated in the view, an apparatus 10 for bending is constituted by a heating furnace 16, a forming-zone 16a and an air-cooling/tempering apparatus 16b as main components. Further, the driving control of each part of the apparatus 10 for bending is carried out by a motion controller CNT constituted by e.g. a computer.

Firstly, the bending step of a glass sheet 18 by the apparatus 10 for bending, will be described. The glass sheet 18 before bending is positioned to a conveying position at the entrance of the heating furnace 16, and is conveyed into the heating furnace 16 by a roller conveyer, not shown. Then, the glass sheet 18 is heated by a heater in the heating furnace 16 while it is conveyed in the heating furnace 16, whereby it is heated up to the bending temperature (about from 600 to 700° C.) at the exit of the heating furnace 16. The glass sheet 18 heated up to the bending temperature, is conveyed by a roller conveyer 13a for bending to the forming zone 16a provided on a downstream side of the heating furnace 16.

Rollers constituting the roller conveyer 13a, are each a curved roller curved vertically downward in a convex form so as to form, in the glass sheet 18, a curved plane curving with respect to the direction perpendicular to the conveying direction. And further, by moving up and down each roller of the roller conveyer 13a like the propagation of a wave while the glass sheet 18 is conveyed in the forming zone 16a, the glass sheet 18 will have a curved plane curving with respect to the conveying direction. As a result, the glass sheet 18 can be formed to have a curved plane having a curvature with respect to two directions. Here, rollers curving vertically upward in a convex form, can also be employed, but from a viewpoint of stability of conveying the glass sheet 18, rollers curving vertically downward in a convex form, are more excellent.

The bent glass sheet 18 is conveyed from the exit of the forming zone 16a into the air-cooling/tempering apparatus 16b by a roller conveyer 13b of the air-cooling/tempering apparatus 16b, to be tempered by air-cooling. The air-cooling/tempering apparatus 16b has an upper blowing head 17a and a lower blowing head 17b disposed sandwiching the roller conveyer 13b, and the glass sheet 18 is cooled and tempered by air blown from the blowing heads 17a and 17b towards the glass sheet 18.

Here, the cooling performance of the air-cooling/tempering apparatus 16b is appropriately set depending on e.g. a thickness of the glass sheet 18. The glass sheet 18 tempered by air-cooling, is conveyed to the inspection apparatus (not shown) as the next step by a roller conveyer 13c from the exit of the air-cooling/tempering apparatus 16b. This is all about the bending step of the glass sheet 18 in the apparatus 10 for bending.

Figure 2:
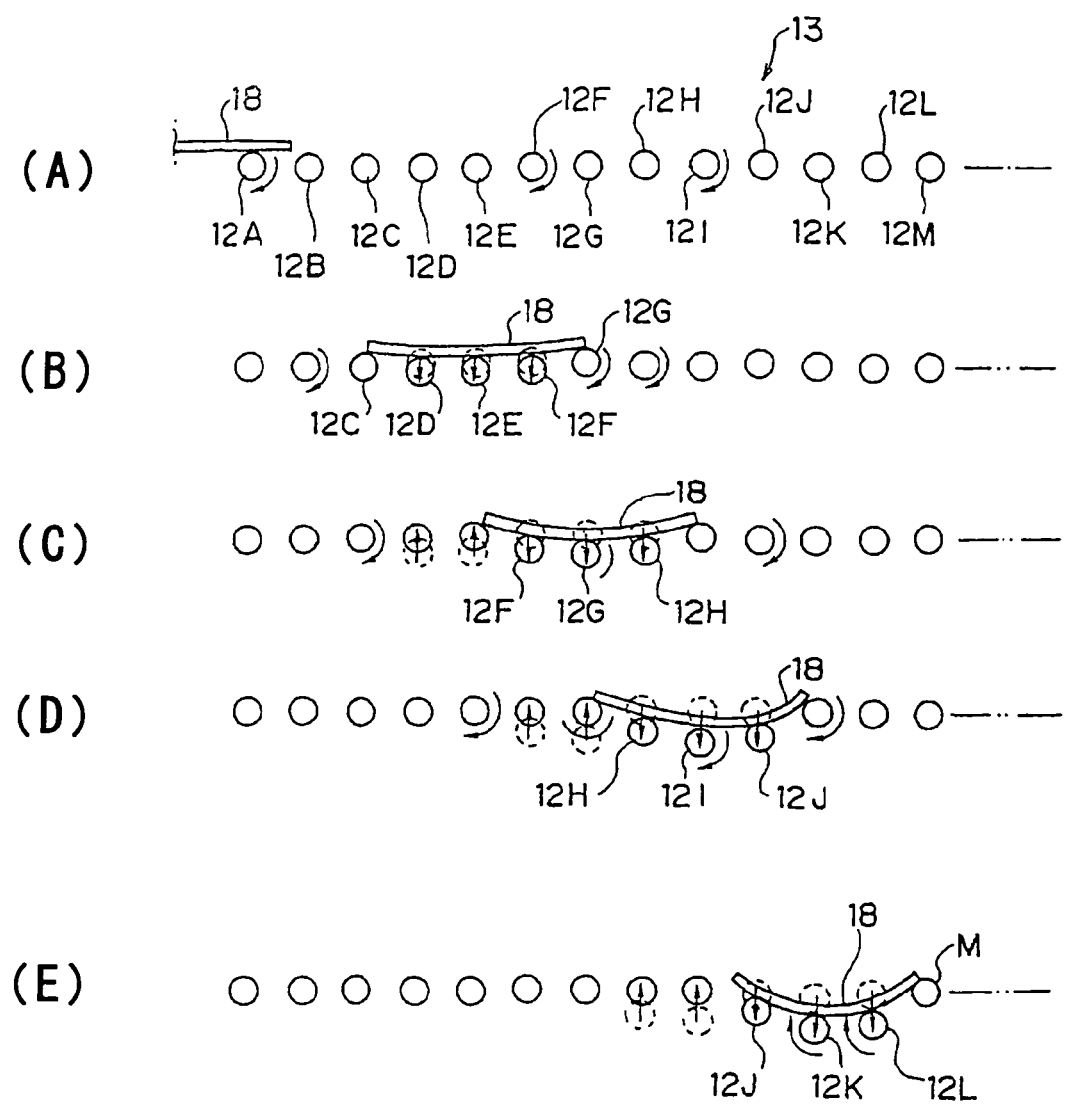
FIG. 2: A view illustrating up/down movement of curved rollers according to the position of a glass sheet being conveyed.

Curved rollers 12A to 12M, . . . , constituting the roller conveyer 13 (13a, 13b and 13c) shown in FIG. 2, are each independently rotated by a rotation driving means (not shown), and each independently moved up and down by an elevating means (not shown). As illustrated in (A) to (E) in the view, the conveying plane of the glass sheet 18 constituted by the rollers, deforms like the propagation of a wave from upstream side to downstream side. As a result, the curvature of the glass sheet 18, gradually increases as it is conveyed from upstream side to downstream side. Here, the driving of these rotation driving means and elevating means, are controlled by a motion-controller CNT in FIG. 1.

Figure 3:
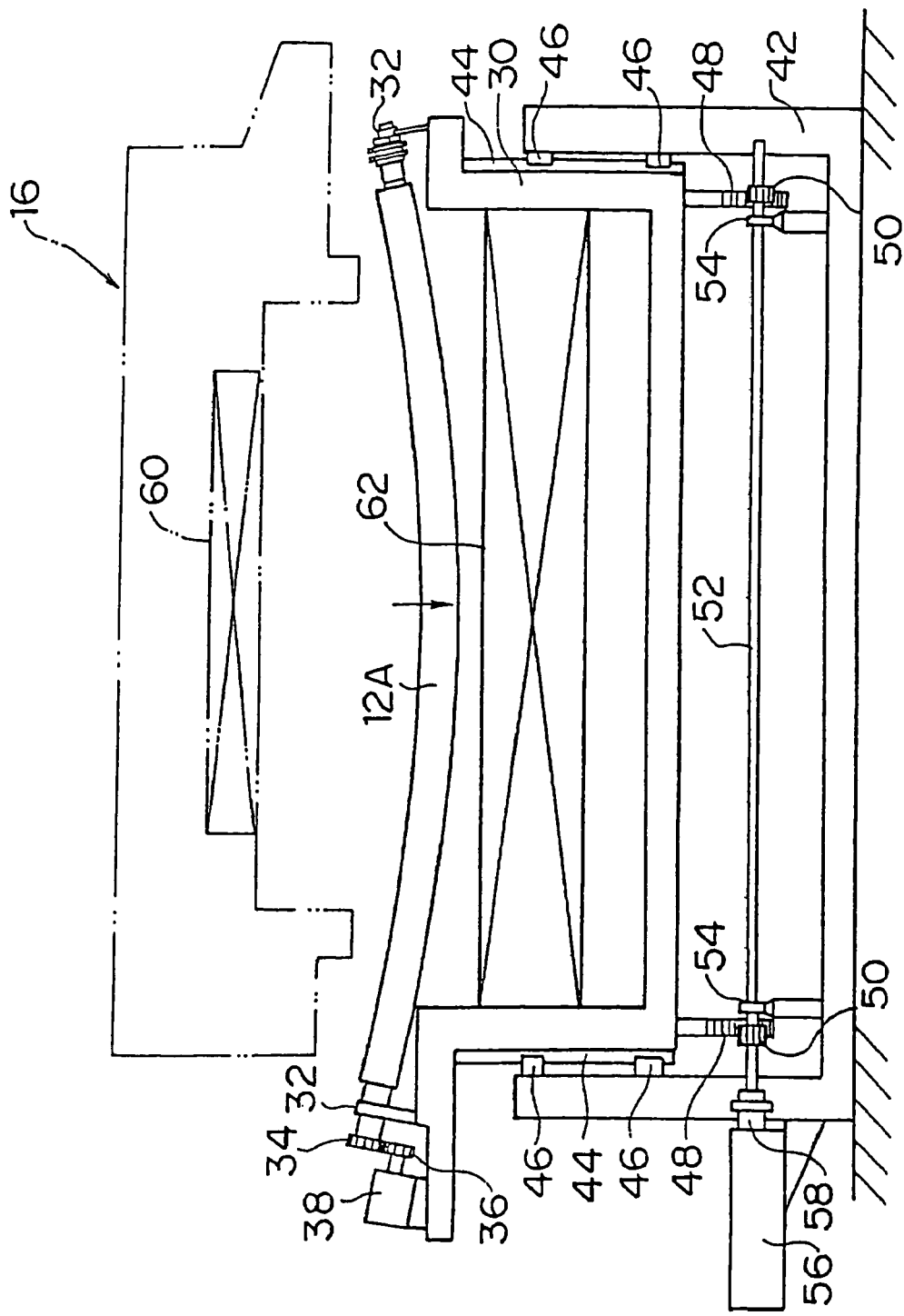
FIG. 3: A view illustrating a mechanism for moving a curved roller up and down.

FIG. 3 is a diagram illustrating a rotation driving means and an elevating means of each of the curved rollers 12A to 12M, . . . . Here, since the rotation driving means and the elevating means of the curved rollers 12A to 12M, . . . , have the same structure, FIG. 3 illustrates only the structure of a curved roller 12A, and the description regarding the structure of other curved rollers 12B to 12M, . . . , is omitted for convenience.

Figure 4:
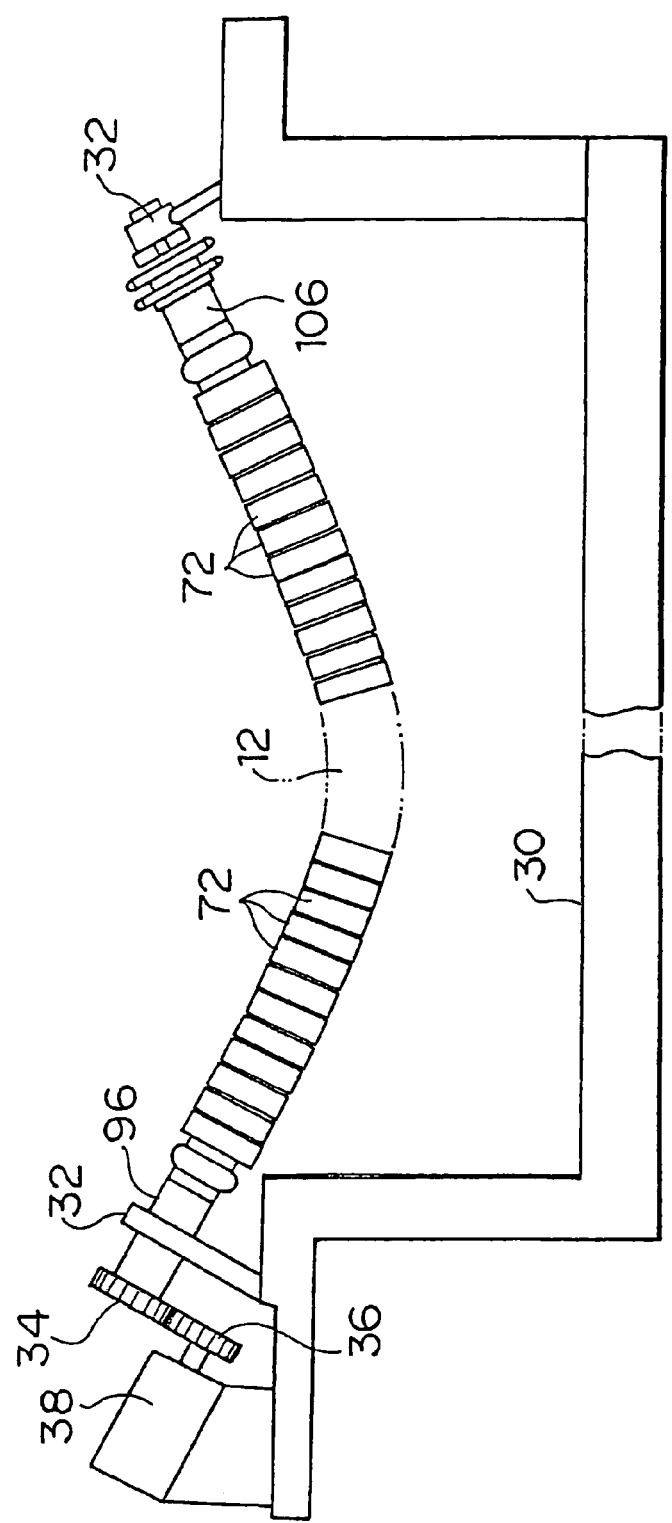
FIG. 4: A view illustrating a curved roller of a first embodiment.

The curved roller 12A is rotatably supported at its both ends via bearings 32, 32 by a movable frame 30 formed to have a concave shape. Further, to the left end of the curved roller 12A in FIG. 3, a gear 34 is attached as shown in FIG. 4, and the gear 34 is engaged with a gear 36 at a side of a servo motor 38. Accordingly, by, driving the servo motor 38, the curved roller 12A is rotated at a predetermined angular speed. This is all about the structure of the rotation driving means.

On the other hand, the movable frame 30 is, as illustrated in FIG. 3, supported at its both sides by a fixed frame 42 via a LM (linear motion) guide so as to be movable up and down. This LM guide comprises a guide rail 44 disposed vertically at a side of the movable frame 30, and linear motion guides 46, at a side of the fixed frame 42, engaged with this guide rail 44.

Further, at both ends of a lower portion of the movable frame 30, racks 48, 48 are provided so as to protrude downward therefrom, and pinions 50, 50 are engaged with the racks 48, 48. The pinions 50, 50 are fixed to a rotational shaft 52 provided horizontally, and the rotational shaft 52 is supported by the bearings 54, 54 at its both ends, and its left end portion in FIG. 3 is connected to a spindle 58 of a servo motor 56. Therefore, when the servo motor 56 rotates the rotation shaft 52, the rotational movement is converted to a linear movement by the effect of the pinions 50 and the racks 48, and a curved roller 12A is moved up and down together with the movable frame 30. That is all about the structure of the elevating means. Here, numeric symbols 60, 62 in FIG. 3 indicate heaters provided in the heating furnace 16. Further, in a case of an out-furnace apparatus for bending having curved rollers 12A to 12M, . . . , provided outside the furnace, the heaters 60, 62 are not provided.

The rotation driving means and the elevating means described above, are provided for all of other curved rollers 12A to 12M, . . . , and the servo motors 38, 56 for those means are controlled by a motion controller CNT in FIG. 1.

When the type of the glass sheet 18 is input from an external input means not shown, the motion controller CNT prepares angular speed control data and up/down movement control data of the curved rollers 12A to 12M, . . . , which correspond to the curvature of the glass sheet 18 of the type. Then, the motion controller CNT controls the servo motors 38 based on the angular speed control data prepared, and controls the servo motors 56 based on the up-down movement control data. Namely, the motion controller CNT carries out multi-axis control of the curved rollers 12A to 12M, . . . , so that the glass sheet 18 is bent to have a desired curvature during the conveyance by the curved rollers 12A to 12M, . . . .

Secondly, the multi-axis control method of the curved rollers 12A to 12M by the motion controller CNT will be described. Basic up/down movement of the rollers is such that according to the conveyance of a glass sheet G, down-movement and up-movement of the curved rollers 12A to 12M, . . . , are carried out sequentially in this order.

The curved rollers 12A to 12M, . . . , subjected to multi-axis control by the motion controller CNT, behave such that for example as illustrated in FIG. 2(A), when the heated glass sheet 18 reaches the entrance side curved roller 12A, all the curved rollers 12A to 12M, . . . , are at the top position, and the curved conveying path 14 defined by the curved rollers 12A to 12M, . . . , is curving only with respect to a B direction (the direction perpendicular to the glass sheet conveying direction) in FIG. 1. Thereafter, when the glass sheet 18 is further conveyed, the curved rollers 12B and 12C move down.

Then, when the glass sheet 18 is conveyed as illustrated in FIG. 2(B), the curved rollers 12D to 12F move down, whereby among the conveying path 14 defined by the curved rollers 12A to 12M, . . . , a curved conveying path defined by the curved rollers 12D to 12F deforms to curve in a gentle downward convex form having a large curvature radius. Namely, the curved conveying path deforms with respect to the direction of A (glass sheet conveying direction) in FIG. 1. Consequently, when the glass sheet 18 passes on the curved rollers 12D to 12F, the glass sheet 18 bends downwardly by its own weight along a conveying plane defined by the curved rollers 12D to 12F, and deforms to have a shape along the curved plane. Consequently, the glass sheet 18 is formed to be a complicatedly curved glass.

Thereafter, when the glass sheet 18 is further conveyed as illustrated in FIG. 2(C), the curved rollers 12F to 12H move down more deeply than the previous curved rollers 12D to 12F, whereby a curved conveying path defined by the curved rollers 12F to 12H deforms to have a curved shape having a smaller curvature radius (sharply curved) than the previous curved conveying path. Consequently, when the glass sheet 18 passes on the curved rollers 12F to 12H, the glass sheet 18 further bends downwardly along the conveying plane defined by the curved rollers 12F to 12H, and is deformed to have a shape along the curved plane.

Thereafter, when the glass sheet 18 reaches a substantially middle point of the curved conveying path as illustrated in FIG. 2(D), the curved rollers 12H to 12J move down more deeply than the previous curved rollers 12F to 12H, whereby a two-directional conveying plane defined by the curved rollers 12H to 12J, deforms to have a curved shape having a smaller curvature radius than the previous curved plane. Consequently, when the glass sheet 18 passes on the curved rollers 12H to 12J, the glass sheet 18 bends downwardly along the conveying plane defined by the curved rollers 12H to 12J, and is deformed to have a shape along the conveying plane.

Thereafter, when the glass sheet 18 reaches a downstream side of the curved conveying path as illustrated in FIG. 2(E), the curved rollers 12J to 12L move down more deeply than the previous curved rollers 12H to 12J, whereby a conveying plane defined by the curved rollers 12J to 12L deforms into a curved shape having a curvature corresponding to the finally obtainable curvature of the glass sheet 18. Consequently, when the glass sheet 18 passes on the curved rollers 12J to 12L, it is deformed to have a shape along the conveying plane, whereby it is bent to have a desired curvature. That is all about the bending operation of the glass sheet 18 by the above curved rollers 12A to 12M.

As described above, the apparatus 10 for bending of this embodiment employs, as rollers of a roller conveyer in an apparatus for bending a glass sheet with respect to the glass sheet conveying direction by moving the rollers up and down, curved rollers 12 each having the surface curved with respect to the direction perpendicular to the glass sheet conveying direction. Consequently, a complicatedly curved glass curved along the conveying direction and along the horizontal direction perpendicular to the conveying direction, can be produced.

In the following, an embodiment of the curved roller 12 will be described.

Figure 5:
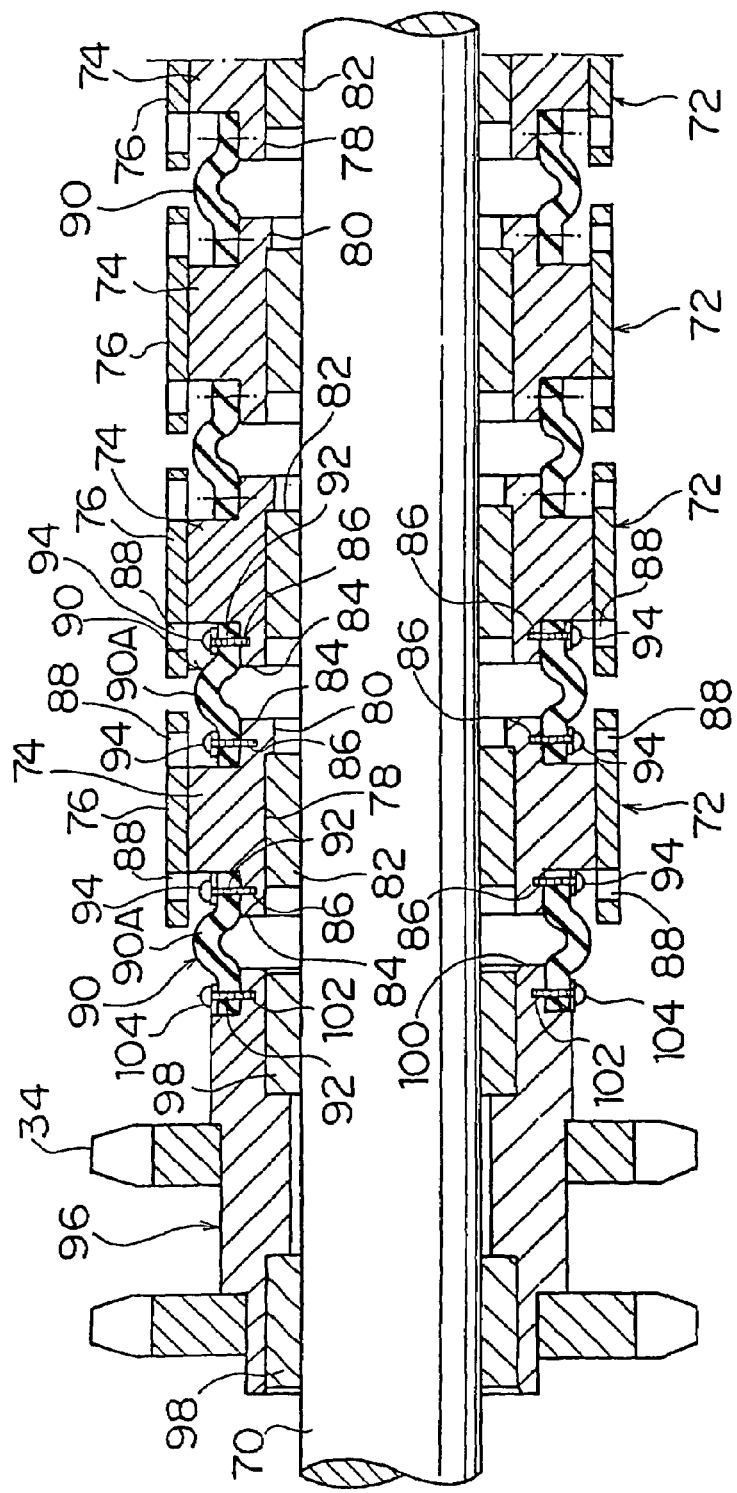
FIG. 5: An enlarged cross-sectional view of the substantial part of the curved roller shown in FIG. 4.

FIG. 4 and FIG. 5 show a curved roller 12 of the first embodiment. In the curved roller 12, a plurality of ring rollers 72, 72, . . . , are rotatably supported by a guide shaft 70 preliminarily bent to have a predetermined curvature. A ring roller 72 is constituted by a roller body 74 and a collar 76. The roller body 74 is formed to have a tubular form, and has in its central portion a large diameter perforation 78 opening to one end and a small diameter perforation 80 opening to the other end. The small diameter perforation 80 is formed to have a large diameter than the outer diameter of the guide shaft 70. A bush 82 is inserted in the large diameter perforation 78, and the bush 82 is fitted to the guide shaft 70. Consequently, the plurality of ring rollers 72, 82, . . . , are rotatably supported by the guide shaft 70.

Further, annular ribs 84, 84 are formed on both ends of the roller body 74 of the ring roller 72, and threaded holes 86, 86, . . . , are formed at two positions in the outer peripheral surface of each of the ribs. Further, a color 76 is fitted to the outer peripheral surface of the roller body 74 by e.g. shrink-fitting. The collar 76 has a width substantially same as the total width of the roller body 74, and a hole 88 is formed in the extension of a threaded hole 86 of the roller body 74.

Adjacent ring rollers 72, 72 are connected to each other by an elastic tubular member 90 made of rubber attached to their circular ribs 84, 84. Namely, the elastic tubular member 90 has perforations 92 at both ends, and is connected by screws 94 each inserted in a perforation 92 and screwed in the threaded hole 86 of the rib 84. Such elastic tubular member 90 has an inflated portion 90A formed in the entire circumference at the middle portion in its width direction.

Further, the curved roller 12 has a sprocket housing 96 at a left end of the ring roller 72. The sprocket housing 96 is rotatably supported by the guide shaft 70 via bushes 98. The sprocket housing 96 has a circular rib 100 formed on a ring roller 72 side end, and threaded holes 102 are formed at two positions in the circular rib 100. To each of the circular rib 100 and the circular rib 84 of the ring roller 72, an end portion of the elastic tubular member 90 made of rubber is fitted. The screws 94 each inserted in the perforation 92 of the elastic tubular member 90 are screwed in the threaded hole 86 of the circular rib 84, and screws 104 each inserted in the perforation 92 of the elastic tubular member 90 are screwed in the threaded hole 102 of the circular rib 100, whereby the sprocket housing 96 and the ring roller 72 are mutually connected. Further, a gear 34 is fixed to the sprocket housing 96.

Here, the connection between the sprocket housing 106 and the ring roller 72 on a right side in FIG. 4, is also achieved by an elastic tubular member 90 made of rubber in the same manner as in the connection between the sprocket housing 96 and the ring roller 72 on a left side, and its connection structure is also the same. Therefore, the description will be omitted.

The curved roller 12 thus constituted, has a guide shaft 70 preliminarily curved, whereby the curved conveying path 14 curved with respect to the direction perpendicular to the glass sheet conveying direction can be formed. Further, in this curved roller 12, when the gear 34 is rotated by a servo motor 38, the torque is transmitted to the ring rollers 72, 72, . . . , via elastic tubular members 90, 90, . . . . Accordingly, the conveying power of the glass sheet 18 can be obtained.

Figure 6:
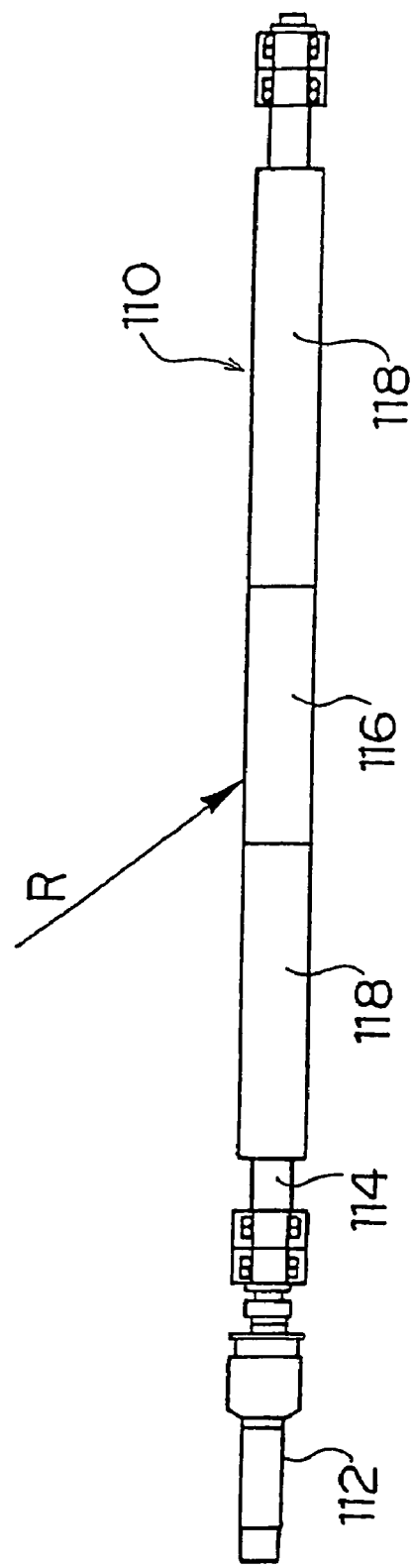
FIG. 6: A view illustrating a curved roller of a second embodiment.
Figure 7:
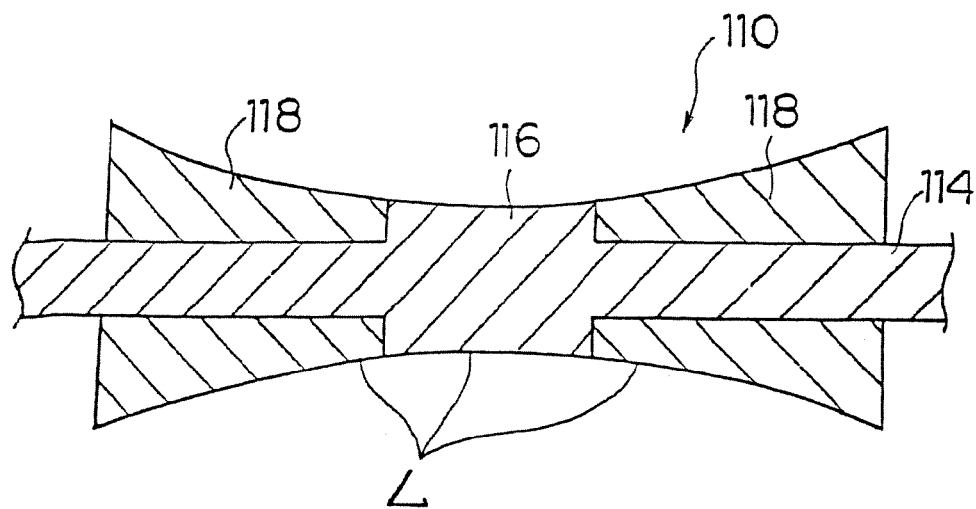
FIG. 7: An exaggerated cross-sectional view of the curved roller shown in FIG. 6.

FIG. 6 and FIG. 7 show a curved roller 110 of the second embodiment. Here, FIG. 7 is an enlarged cross-sectional view showing the curved roller 110 of FIG. 6 with exaggeration. In these Figures, the curved roller 110 is formed to have an hourglass shape. The curved roller 110 comprises a core shaft 114 formed to have a straight rod-shape and connected to a servo motor 112 to be rotated, a driving rotor 116 formed integrally with the core shaft 114 at the central portion in the axial direction of the core shaft 114, and a pair of driven rotors 118, 118 supported by the core shaft 114 on both sides of the driving rotor 116 and each formed to have a substantially frustum conical shape.

According to the curved roller 110, a curved line curved with respect to the direction perpendicular to the glass sheet conveying direction is defined by a ridge line L of each of the driving rotor 116 and driven rotors 118, 118. Therefore, by disposing a plurality of such curved rollers 110, a curved conveying path can be defined.

By the way, if the driven rotors 118, 118 are integrally formed with the core shaft 114 like the driving rotor 116, the driven rotors 118, 118 have larger diameters than the driving rotor 116, and accordingly, peripheral velocities of the driven rotors 118, 118 are larger than that of the driving rotor 116. Therefore, due to a difference of peripheral velocity, slipping will occur between each of the rotors 116, 118, and the glass sheet, which may cause a scratch on the surface of the glass sheet.

For this problem, the curved roller 110 is so constructed that the driving rotor 116 is formed integrally with the core shaft 114, and the driven rotors 118, 118 are driven by the core shaft 114. Accordingly, the driven rotors 118, 118 idle about the core shaft 114 to cancel the above peripheral velocity difference. Therefore, the slip as mentioned above does not occur and glass sheet can be bent well.

Figure 8:
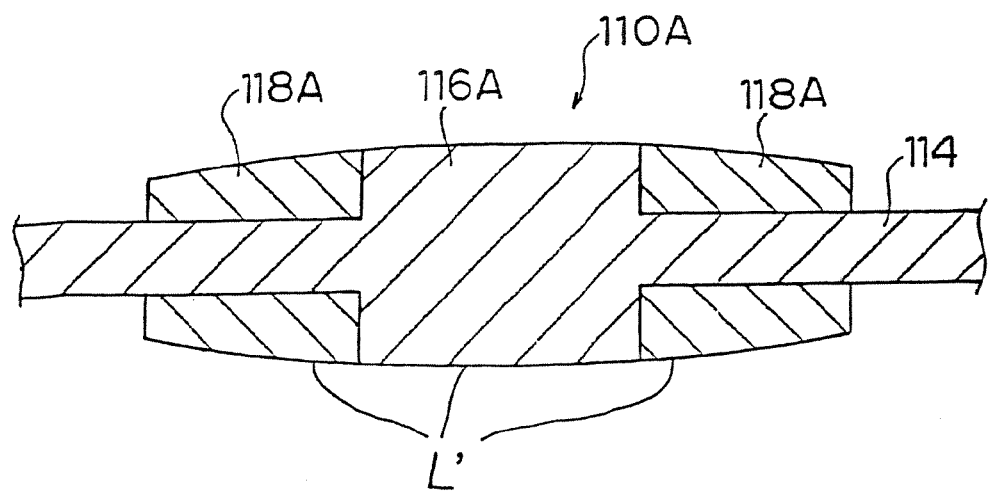
FIG. 8: An exaggerated cross-sectional view of the curved roller formed to have a barrel shape.

Here, instead of the hourglass-shaped curved roller 110, a barrel-shaped curved roller 110A shown in FIG. 8 may be applied. This curved roller 110A has a driving rotor 116A formed integrally with a core shaft 114 at the central portion in the axial direction of the core shaft 114, and a pair of driven rotors 118A, 118A supported by the core shaft 114 on both sides of the driving rotor 116A. According to this curved roller 110A, the ridge line L' is formed in the opposite direction to the hourglass-shaped curved roller 110 shown in FIG. 7.

Figure 9:
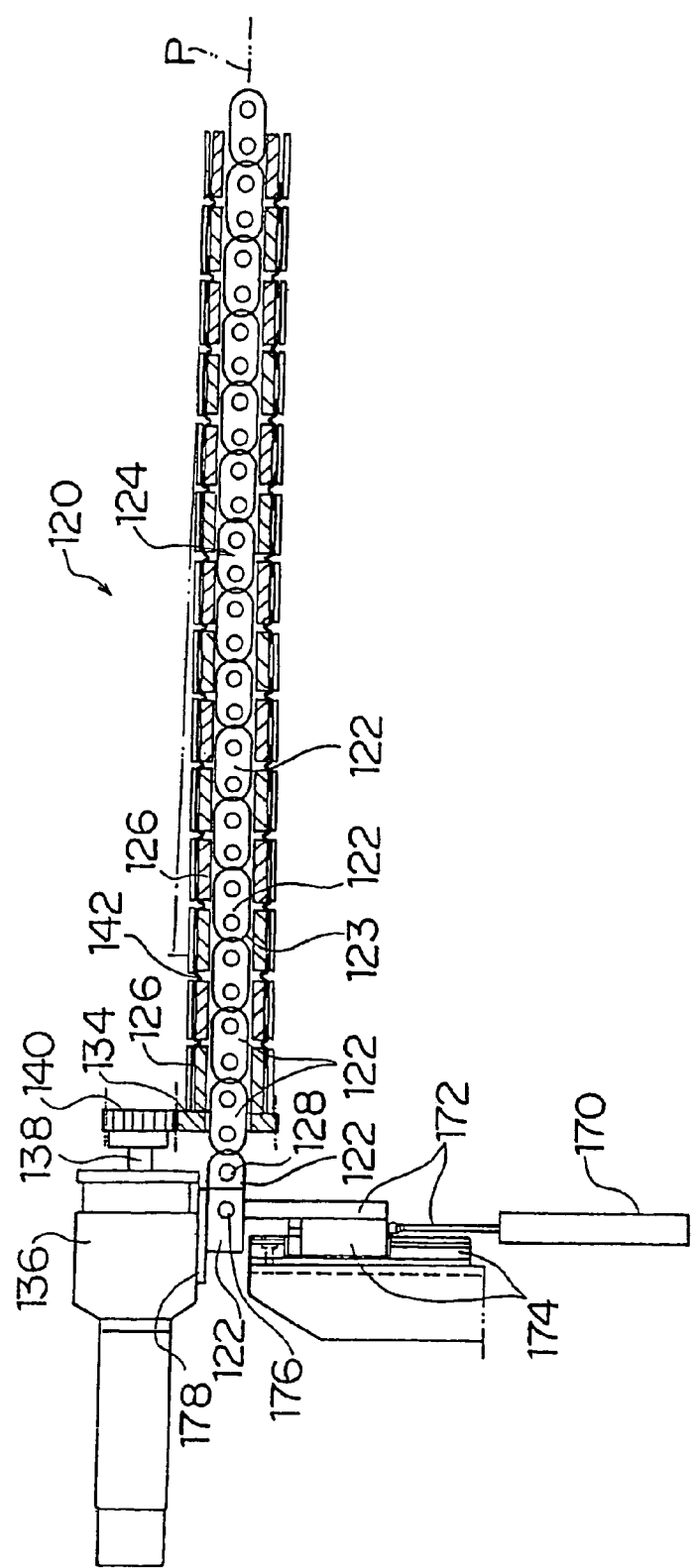
FIG. 9: A view illustrating a curved roller of a third embodiment.
Figure 10:
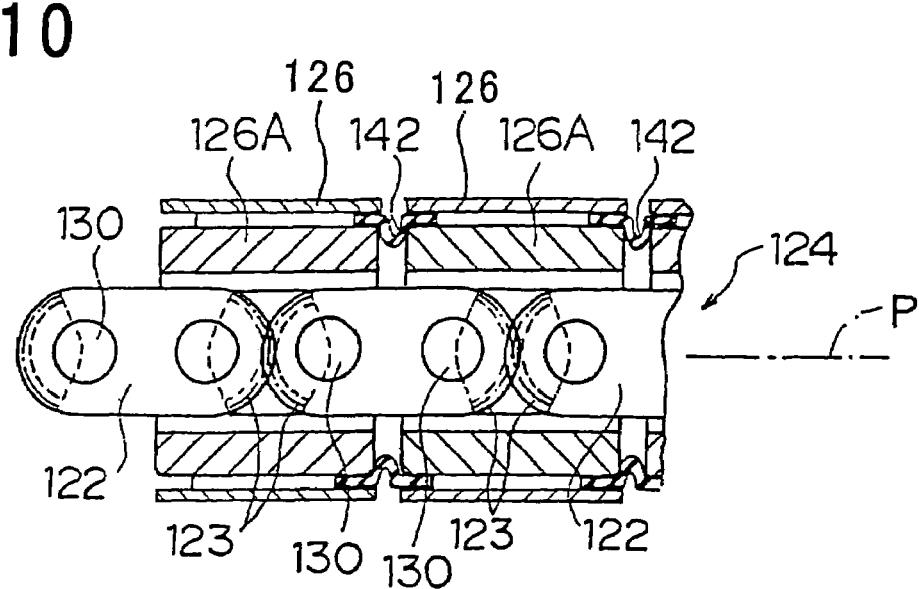
FIG. 10: An enlarged cross-sectional view of the substantial part of the curved roller shown in FIG. 9.
Figure 11:
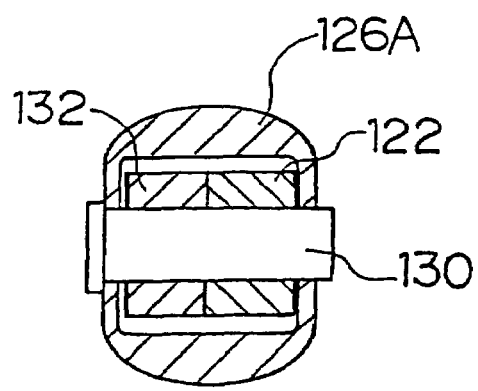
FIG. 11: A vertical cross-sectional view of the curved roller shown in FIG. 9.

FIG. 9 to FIG. 11 show a curved roller 120 of the third embodiment. The curved roller 120 has a rod-shaped curved rod 124 comprising a plurality of oval link members 122, 122, ..., wherein adjacent link members 122, 122 are swingably connected one another via the gear portions 123, 123 in FIG. 10, and a plurality of ring rollers 126 rotatably fitted on the curved rod 124 and rotatable about the axial center P of the curved rod 124.

Further, to a link member 122 at left end side of the curved rod 124 in FIG. 9, a rod portion 172 of a hydraulic cylinder 170 for moving the link member 122 up and down, is connected via a linear motion guide member 174. Further, the link member 122 on the left end side in FIG. 9 is provided on the top end of the rod portion 172 via a pin 176 so as to be swingable in a vertical direction. Here, instead of the hydraulic cylinder 170, an elevating mechanism employing a servo motor and a ball screw device, may be applied. By this elevating mechanism, an up/down stroke control of the link member 122 will become possible.

Figure 12:
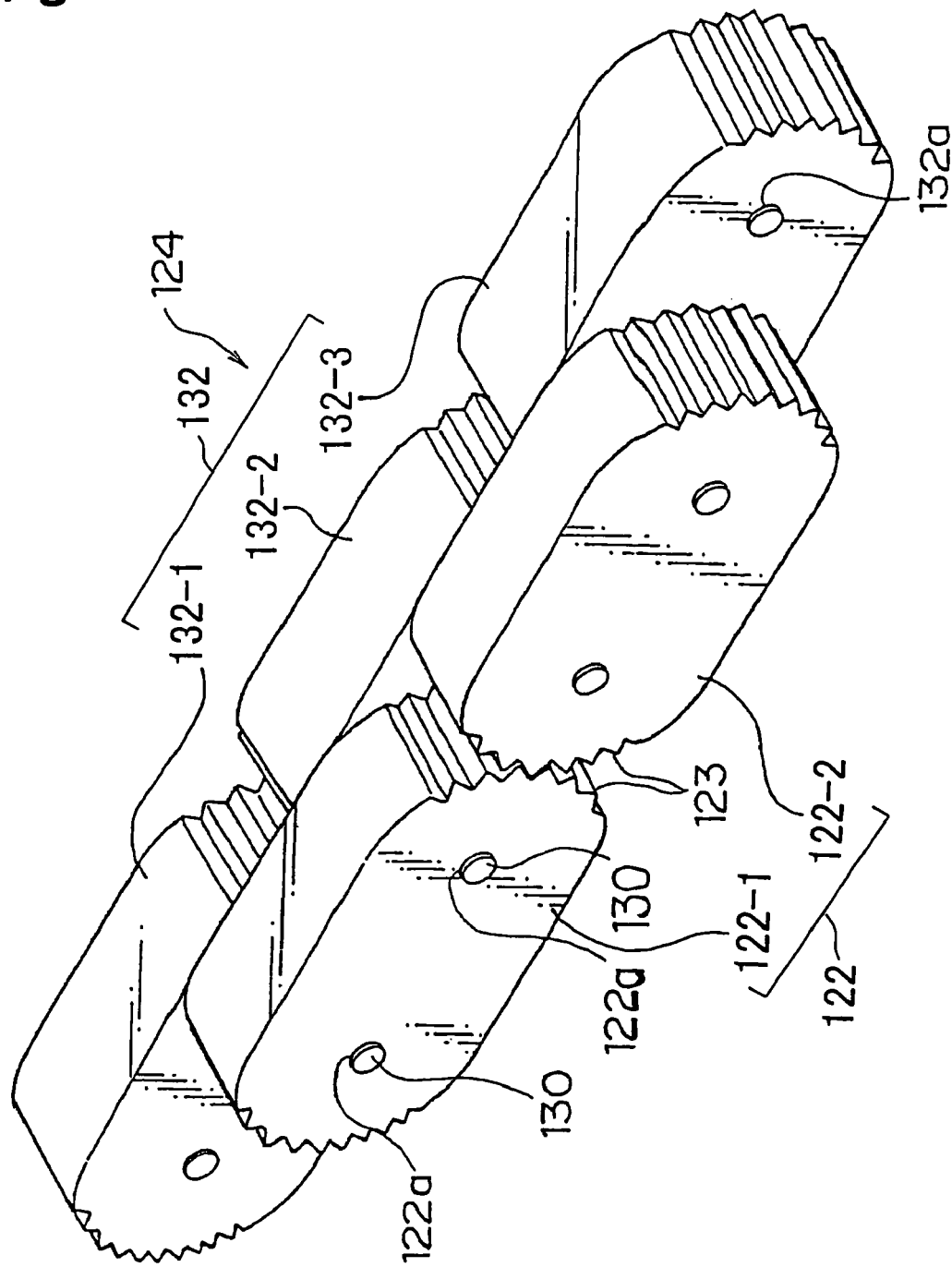
FIG. 12: A diagram of the substantial part of the curved roller shown in FIG. 9.

The curved rod 124 is constituted by a first link structure 122 and a second link structure 130. As illustrated in FIGS. 11 and 12, adjacent link members 122-1, 122-2 are swingably supported by a link member 132 via pins 130, and each of the pins 130 is inserted in pinholes 122a, 132a of the link members 122-1, 132-1, whereby they are swingably supported by the ring roller 126. A link member 132-1 has an identical shape with the link member 122-1, and is attached to the link member 122-1 at a position shifted by a half length of the link member 122-1, and connected with an adjacent link member 132-1 via a gear portion, not shown.

Accordingly, when the left end portion of the link structure 122 at the left end of the FIG. 9 is elevated by elevating the rod portion 172 of the hydraulic cylinder 170 shown in FIG. 9, the left end link member is rotated about the pin 176 in the clockwise direction, and the rotation propagates via gear portions 123, 123 to adjacent link members 122-1, 132-1, 122-2, 132-2, .... By this operation, the crossing angles defined by adjacent pairs of link member 122-1, 132-1, 122-2, 132-2, ..., gradually increase while maintaining all the angles to be equal. Accordingly, the curved rod 124 is curved downward in a convex form having a single curvature.

When the curved rod 124 is curved, cores 126A and each of the ring rollers 126, 126, ..., swing along the curved rod 124, and as a result, the curved roller 120 is curved with a single curvature with respect to the direction perpendicular to the glass sheet conveying direction. Further, by adjusting the amount of elevation given to the curved rod 124, the curvature of the curved rod 124, namely the curvature of the curved conveying path, can be adjusted. Accordingly, a different type of glass sheet having a different model (curvature) can be formed by a single type of curved rollers 120. By this effect, the job change of the curved roller accompanied by the change of the glass sheet model, is substantially eliminated.

Here, a gear 134 is fixed to the ring roller 126 on left end side in FIG. 9, and with the gear 134, a driving gear 140 connected to a spindle 138 of a servo motor 136, is engaged. Further, the ring rollers 126, 126, ..., are connected by elastic tubular members 142, 142, ..., as shown in FIG. 10. Accordingly, by applying the torque of the servo motor 136 to the ring roller 126 at a left end side in FIG. 9, all of the ring rollers 126, 126, ..., are rotated whereby the conveying power for a glass sheet can be obtained. Further, the servo motor 136 is installed on a platform 178 attached to the link member 122 at the left side end in FIG. 9 so as to move up and down together with the link member 122.

Figure 13:
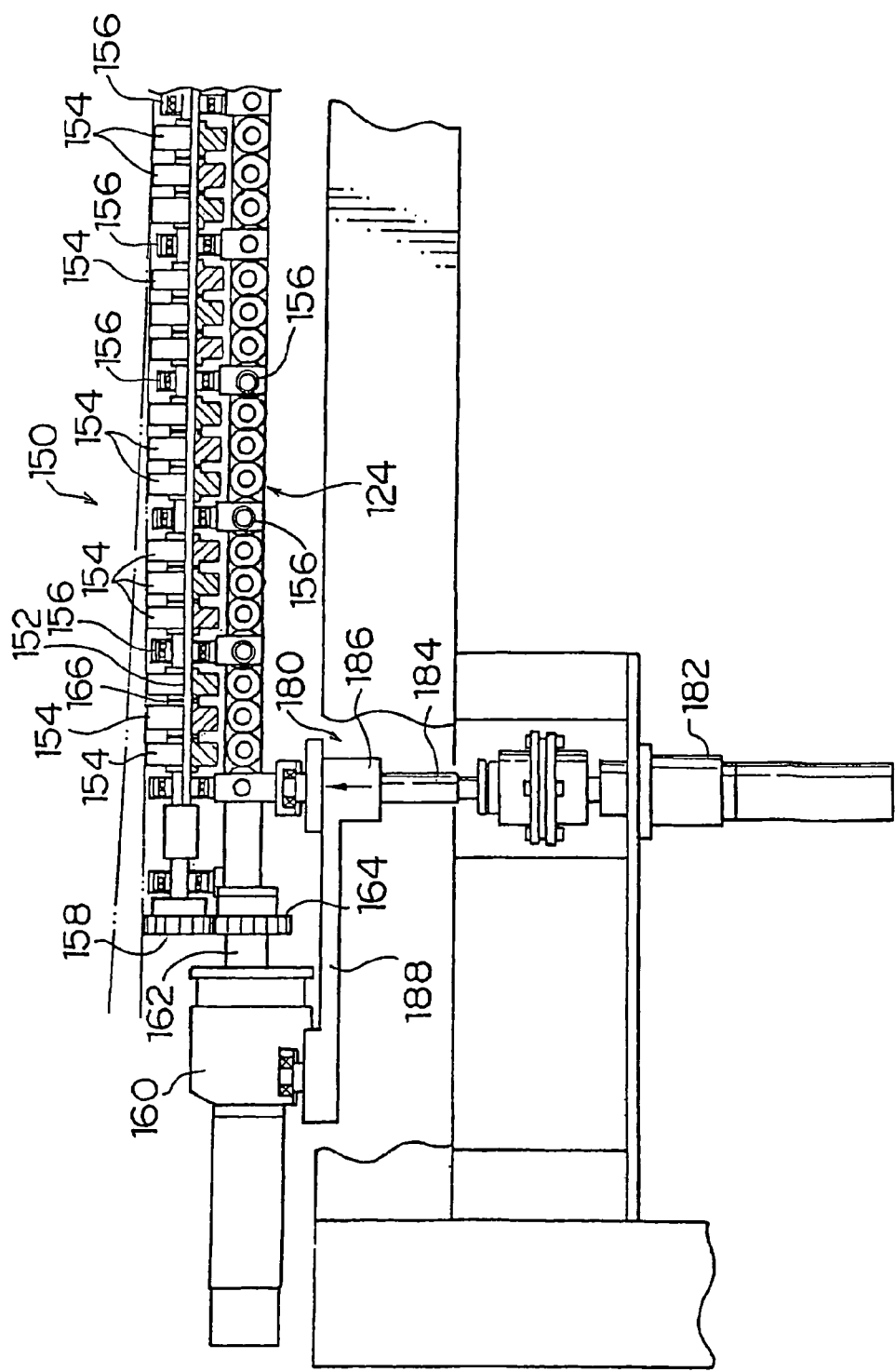
FIG. 13: A view illustrating a curved roller of a fourth embodiment.

FIG. 13 illustrates a curved roller 150 of the fourth embodiment. The curved roller 150 has a flexible shaft 152 constituted to be bendable, a plurality of ring rollers 154, 154, ..., fitted on the flexible shaft 152 so as to rotate about the axial center of the flexible shaft 152, and a link structure 124 (corresponding to the conveying plane curving means in Claim) for bending the flexible shaft 152 into a desired curvature to thereby curve the conveying plane defined by the plurality of ring rollers. The curved rod 124 and the flexible shaft 152 are connected via bearings 156. By curving the curved rod 124, the flexible shaft 152 is bent along the curved rod 124, and the conveying plane defined by the ring rollers 154, 154, ..., is curved with respect to the direction perpendicular to the glass sheet conveying direction.

Further, to the left end portion of the flexible shaft 152 in FIG. 13, a gear 158 is fixed. In addition, with the gear 158, a driving gear 164 connected to a spindle 162 of a servo motor 160, is engaged. Further, the ring rollers 154, 154, ..., are connected via annular connecting members 166. Accordingly, by providing a torque of the servo motor 160 to the flexible shaft 152, all of the ring rollers 154, 154, ..., are rotated whereby the conveying force for the glass sheet can be obtained.

The left end portion of the curved rod 124 in FIG. 13 is connected to a spindle 184 of a servo motor 182 via a ball screw device 180 which moves up and down. Further, to a nut portion 186 of the ball screw device 180, a platform 188 is horizontally connected, and a servo motor 160 is mounted on this platform. Therefore, when the nut portion 186 is moved up and down by rotating the ball screw device 180 by the servo motor 182, the curved rod 124 is moved up and down together with the servo motor 160 to create a single curvature.

Figure 14:
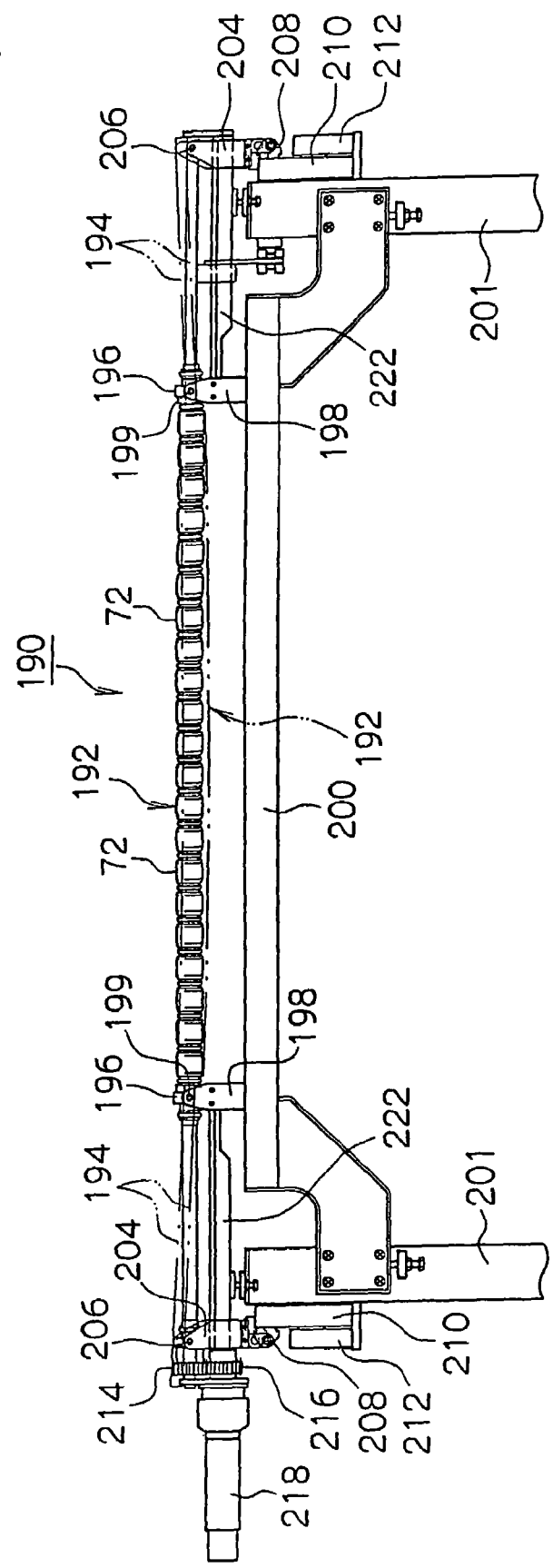
FIG. 14: A side view illustrating another embodiment of the curved roller.
Figure 15:
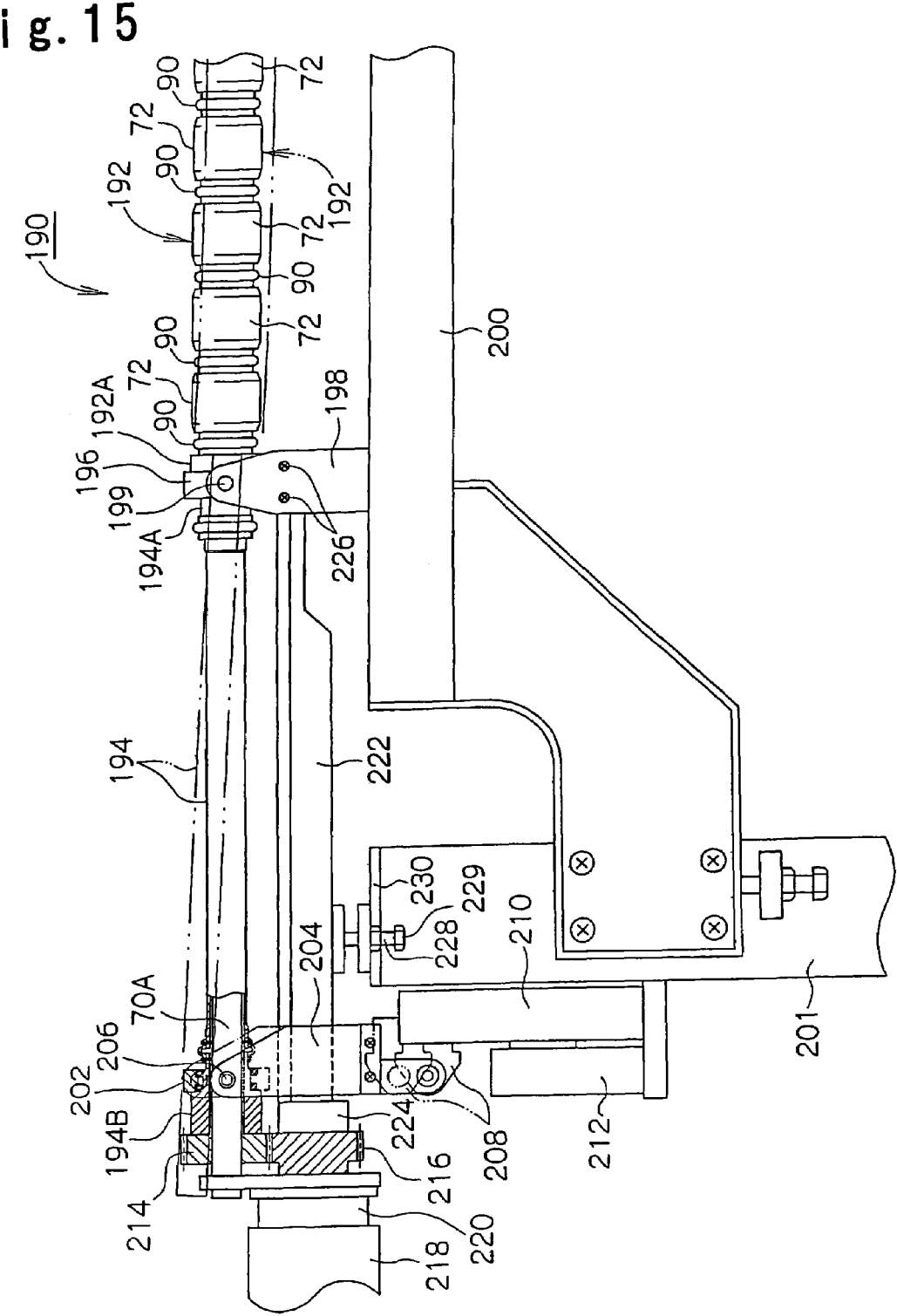
FIG. 15: An enlarged view of the substantial part of FIG. 14.

FIG. 14 and FIG. 15 show another embodiment of the curved roller. Since the roller portion as the main portion for defining the conveying plane of the curved roller 190, has the same construction as the curved roller 12 shown in FIG. 5, members which are the same as or similar to the members of the curved roller 12 are identified with the same numeric symbols. The guide shaft 70 (FIG. 5) of the curved roller 190, is made of a material (for example S45C) bendable due to an elastic deformation and formed to have a straight rod-shape. A plurality of ring rollers 72, 72, ..., fitted on the guide shaft 70, are each connected with an adjacent one via an elastic tubular member made of a rubber, to constitute a single hollow roller structure 192 as a whole.

Both ends 70A of the guide shaft 70 are protruded from both ends 192A of the hollow roller structure 192 by a predetermined length as shown in FIG. 15, and an outer cylinder 194 covering a protruded end 70A, is disposed. One end 194A of the outer cylinder 194, is connected to an end 192A of the hollow roller structure 192, and supported by a supporting member 198 via a bearing 196. Further, the bearing 196 is supported by the supporting member 198 via a horizontally implanted pin 199, so that the outer cylinder 194 and the end 70A of the guide shaft 70 (FIG. 5) can be bent with an elasticity as shown by double dotted lines in FIG. 15. Here, the supporting member 198 is fixed to a stand 200 supporting the entire curved roller 190.

The other end 194B of the outer cylinder 194, is connected to a bracket 204 via a bearing 202. The bearing 202 is rotatably connected to the bracket 204 via a horizontally implanted pin 206, whereby the bending of the outer cylinder 194 and the end 70A of the guide shaft 70 indicated by double dotted lines in FIG. 15, can be permitted when the bracket 204 is elevated.

To a lower portion of the bracket 204, a slider 208 is connected, and the slider 208 is connected to a feed screw device 210 for moving up and down the slider 208. The feed screw device 210 is driven by a driving force of a motor 212. Here, the feed screw device 210 is fixed to a leg portion 201 of the stand 200.

Further, the other end 194B of the outer cylinder 194, is connected to an output shaft 220 of a motor 218 via a gear 214 and a gear 216. In this construction, when the motor 218 is driven, the torque is transmitted via the gear 216, the gear 214 and the outer cylinder 194 to the hollow roller structure 192, whereby the hollow roller structure 192 is rotated. Here, the gear 214 is rotatably supported by the guide shaft 70, and the gear 216 is rotatably supported by a bearing portion 224 of an inclination guide frame 222.

The inclination guide frame 222 has one end attached to the supporting member 198 via pins 226, 226 so as to be inclined, and has the bearing portion 224 formed at the other end. Therefore, the inclination guide frame is inclined according to the bending of the outer cylinder 194 and the end portion 70A of the guide shaft 70 shown by the double dotted lines in FIG. 15. Further, a stopper pin 228 is provided underneath the inclination guide frame 222, and a head portion 229 of the stopper pin 228 is in contact with a stopper plate 230 of the leg portion 201 to limit the inclination angle of the inclination guide frame 222, whereby bending amounts of the outer cylinder 194 and the end portion 70A (refer to double dotted lines in FIG. 15) of the guide shaft 70 are limited.

When the slider 208 is elevated by the feed screw device 210 driven by the motor 212, the force is transmitted via the bracket 204 to the pin 206, and via this pin 206, the outer cylinder 194 is pushed upward as it is pivoted by the pin 199.

By this operation, the outer cylinder 194 and the end portion 70A of the guide shaft 70 are bent as illustrated by the double dotted lines in FIG. 15, and according to this, the hollow roller structure 192 is bent downwardly in a convex form as illustrated by double dotted lines in FIG. 14. Accordingly, the curved roller 190 is curved. The curving angle of the curved roller 190 can be adjusted by controlling the elevated position of the slider 208.

Here, since the pin 206 as a power point is apart by a predetermined distance from the pin 199 as a pivotal point, the curved roller 190 can be curved with a small power without applying an unreasonable power. Further, the right end portion of the guide shaft 70 in the Figure, has substantially the same construction as the above construction. Namely, the driving means for moving up and down the outer cylinder 194 and the guide shaft 70, are provided at both ends of the guide shaft 70, while the rotating driving means for rotating the outer cylinder 194, is provided only at one end of the guide shaft 70. However, as the case requires, the rotating driving means may be provided at both ends of the guide shaft 70, or a means for moving the outer cylinder 194 and the guide shaft 70 up and down may be provided only at one end of the guide shaft 70 wherein the guide shaft 70 at the other end may only be supported so as to be movable up and down by employing e.g. LM guide.

Further, in FIGS. 14 and 15, the hollow roller structure 192 and the outer cylinder 194 are connected via the bearing 196, and the hollow roller structure 192 is rotated by rotating the outer cylinder 194. However, since a very large load is applied to the bearings 196 and 202 in order to curve the guide shaft 70 (FIG. 5), a high durability withstanding the load is required to these bearings. For this problem, it is preferred to attach a gear at the end of the hollow roller structure 194 so that the torque of the motor is transmitted to the end of the hollow roller structure 192 without the bearing 196. It becomes unnecessary to use the outer cylinder 194, and the bearings 196 and 202 becomes unnecessary, whereby the above problem will be solved.

In the above, description has been made with respect to an example of an apparatus for bending which moves up and down each roller of the roller conveyer independently, but the present invention is not limited thereto. Namely, the curved roller 110, 110A, 120, 150 or 192 illustrated in FIGS. 16 to 15 may be applied to the apparatus for bending shown in FIG. 16. Further, these curved rollers may be installed not only in the forming zone but also in the cooling zone where the air-cooling/tempering apparatus is installed, or in the subsequent step. Namely, by installing the curved rollers between the upper and lower blowing ports, the glass sheet is pushed toward the curved rollers by a wind pressure of the air blown from the blowing ports, whereby not only the bending by its own weight in the forming zone, but also the bending by the wind pressure in the air-cooling zone can be carried out.

Figure 16:
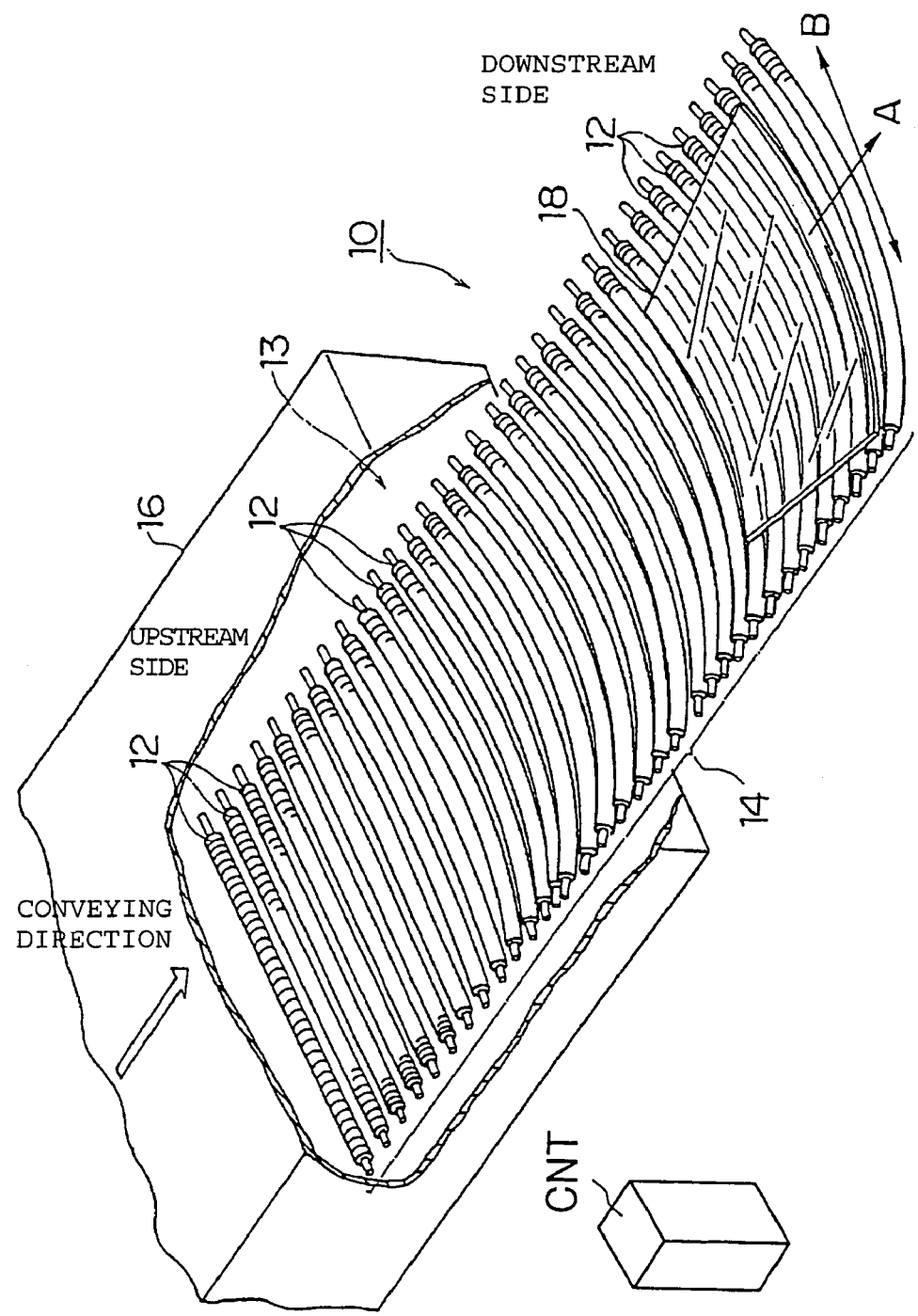
FIG. 16: A perspective view illustrating an apparatus for bending a glass sheet by its own weight.

The apparatus 10 for bending a glass sheet shown in FIG. 16, has a roller conveyer 13 constituted by a plurality of curved rollers 12, 12, .... The specific construction of each of the curved rollers 12, 12, ..., is as illustrated in FIGS. 6 to 15. The curved rollers 12, 12, ..., are disposed substantially in parallel to each other, and a curved conveying path 14 curving along the horizontal direction (the direction indicated by an arrow B in FIG. 16) perpendicular to the glass sheet conveying direction (the direction indicated by an arrow A in FIG. 16), is formed in a roller conveyer 13. The conveying path 14 is formed from the exit of the heating furnace 16 toward the air-cooling/tempering apparatus, not shown, installed outside the heating furnace 16. The driving control of each part is carried out by a motion controller CNT.

Further, the curvature of the curved conveying path 14 with respect to the direction of arrow B, gradually increases from the upstream side of the curved conveying path 14 towards the downstream side, and becomes a curvature corresponding to the curvature of the produced glass sheet at the most downstream side of the curved conveying path 14. Therefore, the glass sheet 18 conveyed in the heating furnace 16 is bent gradually by its own weight according to the curvature of the curved conveying path 14, and bent to have a curvature corresponding to the produced glass sheet at the most downstream side of the curved conveying path 14.

INDUSTRIAL APPLICABILITY

As described above, according to the apparatus for bending a glass sheet according to the present invention, a curved roller which has a roller surface curved with respect to the direction perpendicular to the glass sheet conveying direction, is applied as a roller for the apparatus for bending a glass sheet with respect to the conveying direction by moving rollers of a roller conveyer up and down, whereby a complicatedly curved glass having a curved plane with respect to two directions can be formed.

The entire disclosure of Japanese Patent Application No. 2001-217759 filed on Jul. 18, 2001 including specification, claims, drawings and summary is incorporated herein by reference in its entirety.

What is claimed is:

1. An apparatus for bending a glass sheet, comprising:
   a heating furnace to heat the glass sheet to a bending temperature;
   a roller conveyer having a plurality of curved rollers to convey the heated glass sheet along a conveying plane defined by the curved rollers, said curved rollers being movable up and down according to a position of the glass sheet, to have a part of said conveying plane bent with respect to a conveying direction of the glass sheet thereby to let the glass sheet bend by its own weight to have a desired curvature;
   each of the curved rollers having a bendable shaft wherein a series of ring rollers are fitted to the shaft so as to rotatable about the shaft, wherein both ends of the shaft are supported by each elevating mechanism for each of said ends and are further supported by each supporting member at each position inside thereof by a predetermined distance from each said elevating mechanism and wherein each said elevating mechanism is configured to lift up and down each said end of the shaft while the shaft is supported by each supporting member as a fulcrum point, to thereby curve the shaft and curve the conveying plane defined by the series of ring rollers.

2. An apparatus for bending a glass sheet according to claim 1 wherein the series of ring rollers are respectively connected to one another by a plurality of flexible members.

3. The apparatus for bending a glass sheet according to claim 1 further comprising a motion controller configured to control up and down movement of the elevating mechanism.

4. The apparatus for bending a glass sheet according to claim 1 wherein said curved rollers are arranged in a cooling zone.

* * * * *